Aug. 13, 1935.   H. J. CRINER   2,011,474
SLICING MACHINE
Filed June 20, 1930   3 Sheets-Sheet 1
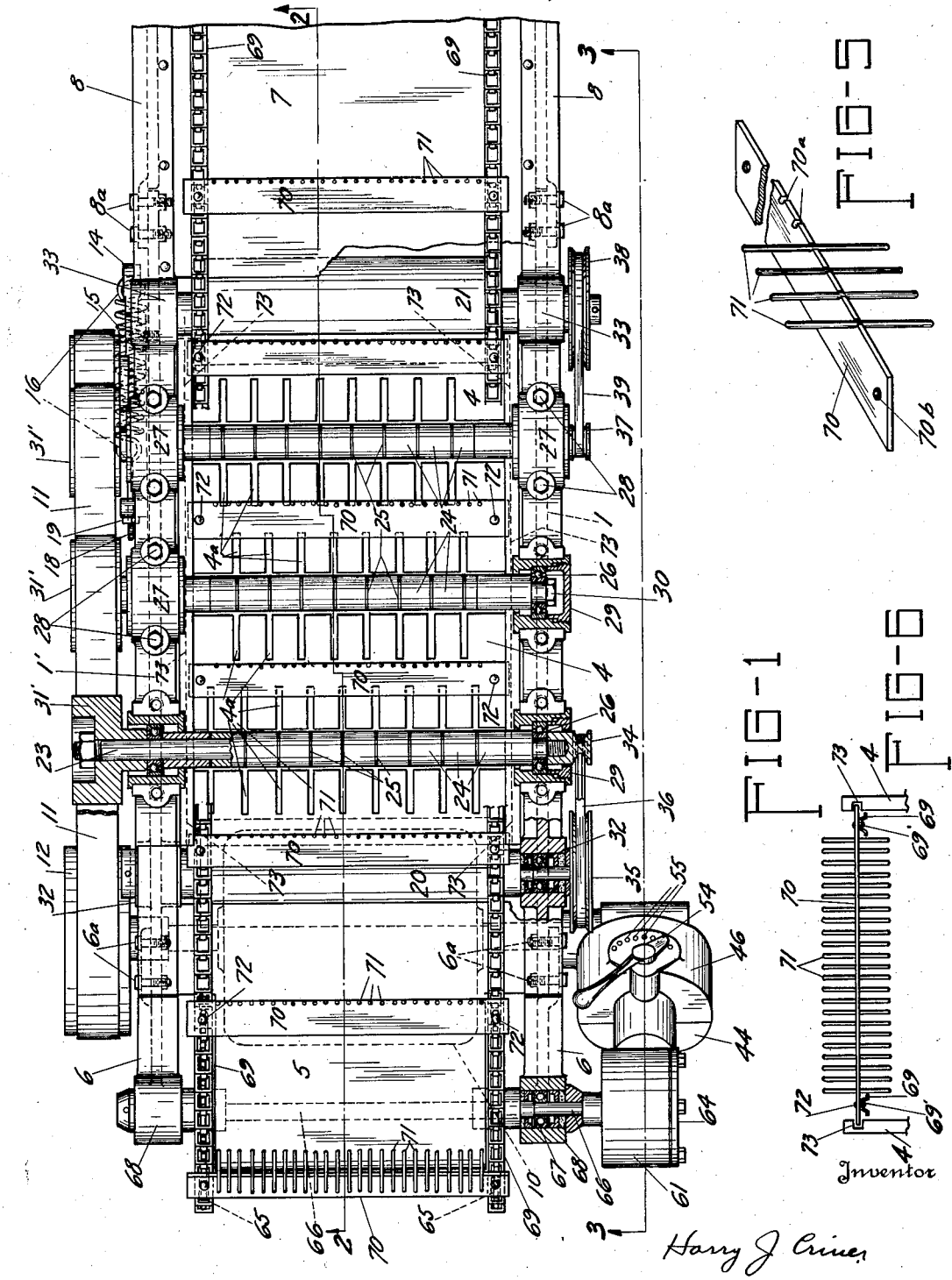
Inventor
Harry J. Criner
By
Curtis V Bish Attorney

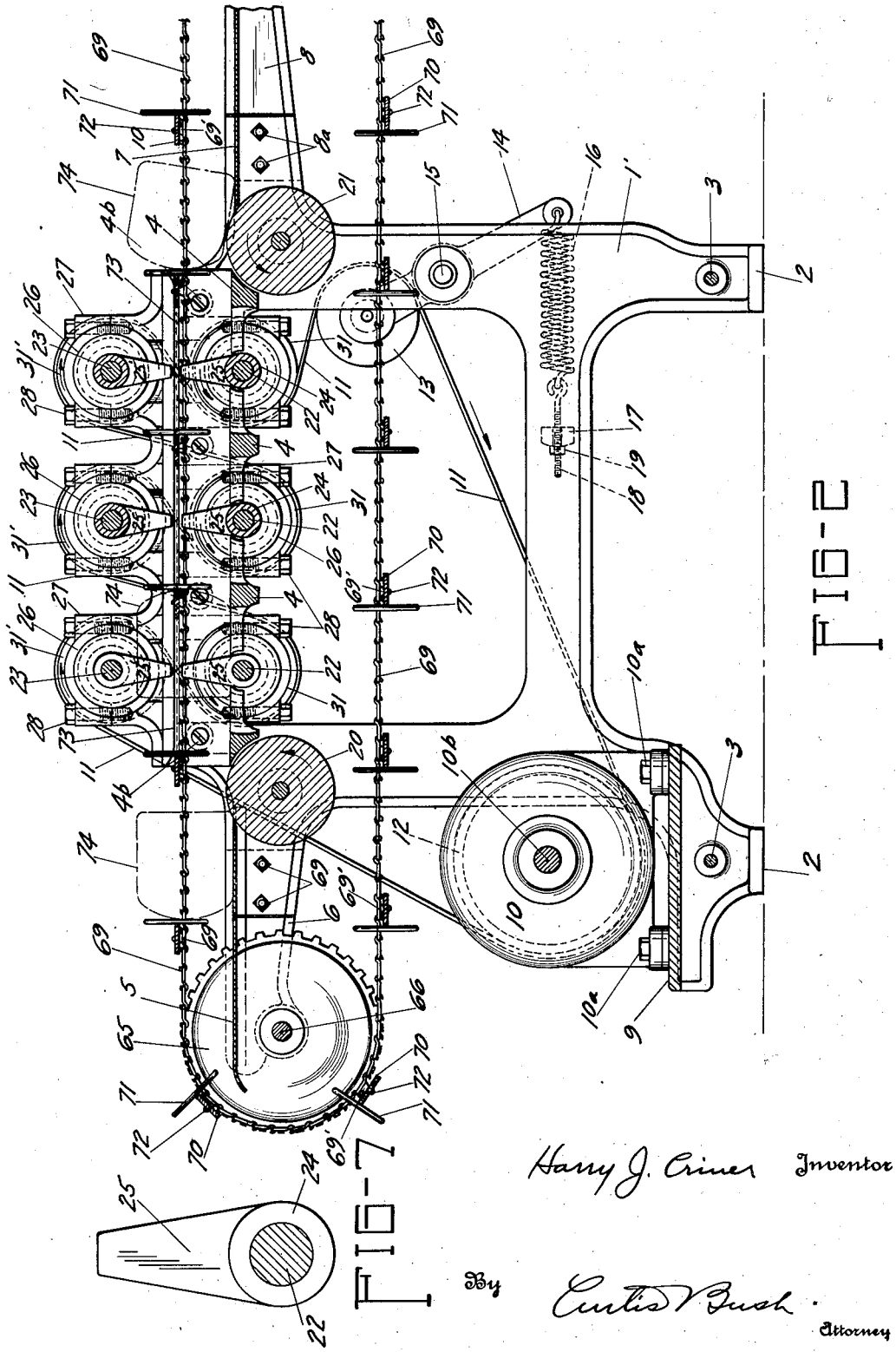

Aug. 13, 1935.  H. J. CRINER  2,011,474
SLICING MACHINE
Filed June 20, 1930  3 Sheets-Sheet 3
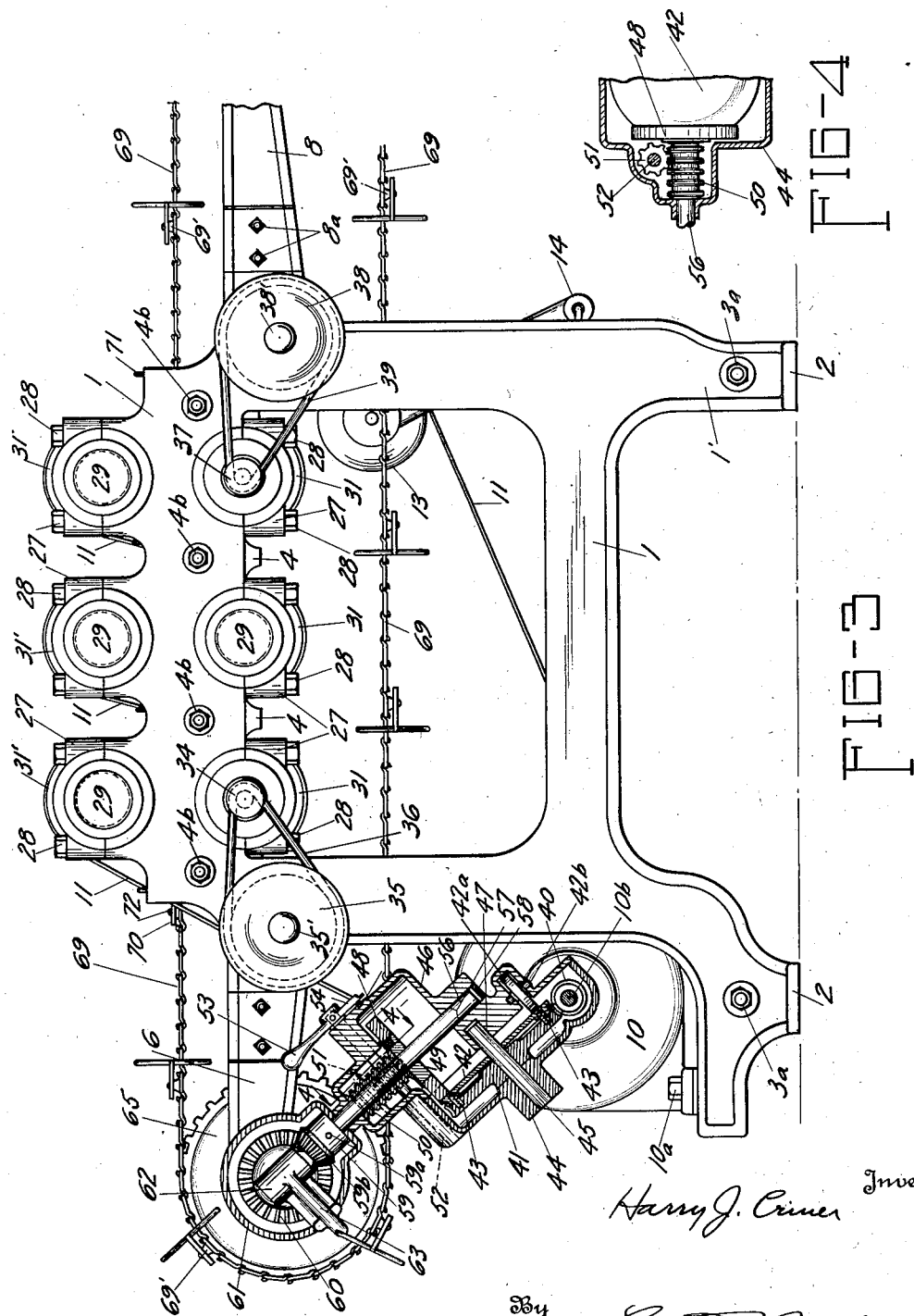
Inventor
Harry J. Criner
By
Curtis V. Bush
Attorney Patented Aug. 13, 1935

2,011,474

UNITED STATES PATENT OFFICE 2,011,474

SLICING MACHINE

Harry J. Criner, Davenport, Iowa, assignor, by mesne assignments, to The Micro Corporation, Bettendorf, Iowa, a corporation of Delaware Application June 20, 1930, Serial No. 462,559

4 Claims. (Cl. 146—98)

My invention relates to improvements in bread slicing machines in which a plurality of series of opposed rotary cutting blades are used to slice the bread and particularly to the class of machines which leave the successive slices of bread united by a small uncut portion, although with certain modifications, it might also be used to slice loaves entirely through, and the objects of my invention are:

1. To provide a machine of superior efficiency and speed of operation which will permit a practically continuous flow of loaves of bread to the cutting mechanisms;

2. To provide improved cutting blades;

3. To provide means by which the rotary cutters may operate in the direction of the travel of the bread without danger of displacement of the loaves during the cutting operation;

4. To provide means for accelerating the travel of the bread at the point where it first reaches the cutting mechanism and for retarding it while it is passing through the several series of cutters;

5. To provide adjustable means for regulating the feed of the bread to and through the machine;

6. To provide improved means for maintaining uniform tension upon the driving belt and rapidly taking up any slack that may occur therein.

I attain these objects by the means illustrated in the accompanying drawings, in which,—

Figure 1 is a plan view of my machine but with a portion of the right or front end of the machine broken away for clearness of illustration and showing some of the bearings and connected parts in section;

Figure 2 is a sectional elevation on the line 2—2 of Figure 1;

Figure 3 is a side elevation of the machine showing the adjustable driving mechanism in section on the line 3—3 of Figure 1;

Figure 4 is an enlarged detail of a portion of the adjustable driving mechanism;

Figure 5 is an enlarged detail of one of the cross-bars and pins secured therein;

Figure 6 is a detail showing the arrangement of the grooves which guide the cross-bars, 70;

Figure 7 is an enlarged detail showing the preferred form of cutting blade.

Similar numerals refer to similar parts throughout the several views.

My apparatus comprises a frame made up of side members, 1 and 1', which correspond closely, and tie-rods, 3, connecting the side members, 1 and 1', and secured in place by nuts, 3a, threaded thereon.

In the upper portion of the side members, 1 and 1', I mount a plurality of cutter shaft bearings, 26, arranged in two series, one series being directly above and spaced from the other series. I prefer to use self-aligning ball-bearings to reduce friction and insure smoothness of operation.

In the lower series of bearings, I mount the lower cutter shafts, 22. Each of these cutter shafts extends transversely of the machine and each of them carries upon one end adjacent the side member, 1', a pulley, 31, united thereto adapted to be driven by a belt, 11, from any suitable source of power.

Directly over the lower cutter shafts, I mount the upper cutter shafts, 23, which extend transversely of the machine and the corresponding ends of which carry similar pulleys, 31', adapted to be driven by the belt, 11.

The front lower cutter shaft carries upon its opposite end a small drive pulley, 37, and the opposite end of the rear cutter shaft carries a similar drive pulley, 34. A feed roller, 21, is mounted between the side members upon a shaft, 38', which extends transversely of the machine and is mounted in suitable bearings, 33, formed therein. A discharge roller, 20, extends transversely of the side members and is mounted upon a shaft, 35', which is revolvably mounted in suitable bearings formed in the side members, 1 and 1'.

The feed roller shaft, 38', carries a pulley, 38, which is driven by a belt, 39, from the drive pulley, 37, and the discharge roller, 20, carries upon one end a pulley, 35, which is driven by a belt, 36, which in turn is driven by the pulley, 34. The pulleys, 37 and 38, and the pulleys, 34 and 35, are so proportioned that the feed roll and discharge rolls operate at a much lower speed than the cutter shafts, 22.

A bread board or support, 4, extends transversely of the central portion of the machine between the side frames and is secured to the side frames by upwardly extending flanges and bolts or set screws, 4b. This bread support has a plurality of transverse openings surrounding the cutter shafts, 22, and the portions of the bread board adjacent the cutter shafts are deeply slotted with slots, 4a, so as to permit the cutting blades, 25, to revolve through these slots, 4a, without striking the bread board, 4.

Upon each of the lower cutter shafts, I mount a series of blades, 25, and upon each of the upper cutter shafts I mount a corresponding series of blades, 25'.

A motor, 10, is mounted upon the frame and secured thereto by bolts, 10a. The motor shaft, 10b, carries upon its outer end a drive pulley, 12, which drives the belt, 11. The belt, 11, passes partially around each of the lower and upper drive pulleys on the cutter shafts alternately and is so positioned thereon as to drive the cutter shafts in opposite directions, but preferably in the direction in which the bread travels when being fed to the machine by the conveyors to be hereafter described.

An idler pulley, 13, is revolvably mounted in one end of a take-up arm, 14, pivoted to the machine by a pivot, 15. A tension spring, 16, has one end united to the lower end of the arm, 14, and its opposite end united to an adjusting bolt, 18, which passes through a stud, 17, formed upon the side frame, 1', and adjustable therein by an adjustment nut, 19, threaded upon the bolt, 18. The action of the spring, 16, when under tension, will be to retract the lower end of the arm, 14, thereby forcing the pulley, 13, tightly against the belt, 11, and taking up any slack that may occur therein.

On the inner face of the side members, 1 and 1', I form narrow grooves, 73, which receive the outer ends of and act as guides for the cross-bars, 70. These cross-bars are flat strips of metal extending transversely of the machine and each of them has a plurality of pins, 71, secured at the front edge thereof and so positioned as to pass between the paths of the various cutter blades.

The ends of the cross-bars, 70, are secured by rivets, 72, upon studs, 69', which are formed upon uniformly spaced links in the sprocket chains, 69. Sprocket wheels, 65, are mounted upon sprocket shafts, 66, secured in suitable bearings at the front and rear ends of the side frames, it having been necessary to omit the front sprockets on account of lack of room, but the front sprockets are in every way similar to the rear sprockets and are similarly mounted. Sprocket chains, 69, are mounted upon the sprocket wheels, 65, and move longitudinally of the machine, carrying the cross-bars, 70, with them as they move.

The sprocket wheels are driven by a bevel gear wheel, 60, united to the rear sprocket shaft, the shaft being preferably mounted in ball-bearings, 67, mounted in bearing housings, 68, formed in the side frame members, 1 and 1'.

In the operation of bread slicing machines, it is desirable to use bread wrapping machines in connection therewith, and when so used, it is necessary to synchronize the two machines so that the sliced loaves will be delivered to the wrapping machine at proper intervals.

In order to furnish means for controlling the rate at which the loaves of bread will be sliced by this machine, I provide a variable drive arranged as follows: Upon one end of the motor shaft, 10b, I form a worm, 40, which projects into a gear case, 44, which may be united to the side frame member, 1, by any suitable means. A worm gear, 41, is mounted upon a suitable pinion, 45, within the gear case, in mesh with the worm, 40.

A disc, 42, preferably of hardened steel or other suitable material, is mounted upon the worm gear shaft, 45, and splined thereon so as to be free to slide within certain limits. The disc, 42, is cushioned by a plurality of coiled compression springs, 43, mounted in suitable bores or sockets formed in the worm gear.

A friction disc, 48, is slidably mounted upon a shaft, 56, mounted in suitable bearings, 51, formed in the gear case, 44.

In order to balance the disc, 42, I provide an idler, 42a, secured upon a pin or shaft, 42b, mounted in the gear case, 44, opposite the friction disc, 48. The disc, 48, has united thereto a hub, 49, which has an annular rack, 50, cut therein, and this rack meshes with a pinion, 51, which is united to the inner end of the pinion shaft, 52, within the gear case, 44. The outer end of the pinion shaft, 52, is provided with a control handle, 53, which has an extension, 54, formed upon one end thereof. A series of detents or index points, 55, are formed upon the outer face of the gear case in the path of travel of the extension, 54, of the handle, 53. The upper end of the shaft, 56, has a collar, 59, secured thereto by a pin, 59a, adjacent to a bevel gear pinion, 59b, which meshes with the bevel gear, 60, previously described.

An apron, 7, is mounted between the side members, 1 and 1', at the intake end of this machine, upon which the bread may be placed to be fed to the machine by the conveyor and a similar apron, 5, is mounted between the side frames at the discharge end of the machine to receive the bread as it comes away from the cutters and the discharge roll, 26.

The blades, 25, are splined or keyed upon the cutter shafts and are kept at a fixed distance apart by spacers, 24, mounted upon the shafts between the blades. While various forms of blades may be used, I prefer to use the form shown in Figure 7 in which the body of the blade is no larger than the spacers which separate the blades and the extended cutting portion is sharpened upon its advancing edge and upon its outer circumference. I prefer to form the outer circumference of my blade upon an arc described by a radius corresponding to the radius upon which the outer edge of the blade travels as it revolves with the cutter shaft without rounding the corners as I find that sharp corners improve the cutting action of the blades.

While I have shown three opposed pairs of cutter shafts, it is obvious that the number may be varied to suit the desires of the user. In slicing bread with rotary cutters, it is important that any crowding or jamming action due to the wedging effect of the cutters, be avoided. To avoid this, it is necessary to limit the number of cutters which are in a given loaf of bread at a given time. I therefore prefer to use three pairs of cutter shafts. For ordinary 12 inch loaves, this will require 9 blades upon each of one pair of shafts and 8 blades upon each of the shafts of the other two pairs in order to provide a slice of standard thickness—approximately half an inch or slightly less.

I prefer to arrange the blades upon a given shaft in two rows extending in diametrically opposite directions and the shafts of a given pair are so arranged that the blades upon one shaft of such pair travel in the same vertical planes as the blades upon the other shaft of said pair and when blades upon the lower shaft are extending directly upwardly therefrom, corresponding blades upon the upper shaft are extending directly downwardly therefrom so as to cut simultaneously. The blades of each of the other pairs are similarly arranged.

I also arrange the belting of my machine so that the shafts of a given pair travel always in opposite directions and that the blades travel in the direction in which the bread is moving as fed to the machine.

When traveling in this direction, the cutters tend to accelerate the feeding motion of the bread and it is necessary to provide means for retarding the bread as it passes through the cutters. I have accordingly arranged my feeding apparatus so that as the loaves are brought into the machine at the front or right end of Figure 2, they are pushed forward by the rear edge of the cross-bar, 70. As soon as a given loaf of bread comes in contact with the feed roller, 21, which is moving at a higher rate of speed than the chain, 69, the loaf is carried rapidly toward the rear until it comes in contact with the pins, 71, and front edge of the cross-bar, 70, of the preceding cross-bar.

Before the loaf has passed entirely away from the feed roll, 21, the cutting operation of the first series of cutters has begun and the pressure or friction exerted upon the loaf by these cutters keeps the loaf in contact with such pins, 71, and cross-bar, 70, until it reaches the next series of cutters and the same retarding action follows through each of the series of cutters. As the bread leaves the last series of cutters, it is kept in contact with the pins by the discharge roll, 20, until it is delivered out upon the apron, 5, from which it may be removed either manually or from which it may be delivered to a wrapping machine as desired.

My machine is preferably designed to be capable of a speed that will drive the cutters from six hundred to twelve hundred revolutions per minute or from ten to twenty revolutions per second, while the bread may travel at a speed of 1½ to 3 inches per second. It is thus obvious that each blade will pass through a given loaf many times. As the most advantageous speed for the cutters and feeding apparatus will vary with different varieties of bread stuff and with the length of time that has elapsed since baking, I do not limit my claims to any given speed of operation.

In the operation of my machine, after the belting is adjusted, the motor is started and the feed control set at the desired speed. The bread is then placed upon the apron, 7, either manually or mechanically as desired and each loaf is preferably laid upon one side with the top of the loaf turned toward the cutters so that the first part of the loaf to be cut will be what was the top of the loaf as it stood in the oven during the baking process. It is quite important to feed the loaf in this way because the top of the loaf is frequently much softer than the bottom of it and in such cases, it is desirable to cut the top first to avoid any crushing effect.

As the bread reaches the feed roll, 21, it is carried forward until it comes in contact with the pins, 71, which act as a retarder to retain the bread against displacement as it passes through the successive series of cutters as above described. The first series of cutters cuts one-third of the desired number of slices, the second series cuts an additional third and the last series cuts the remaining third.

As the bread leaves the last series of cutters, it is carried forwardly by the discharge roll, 20, onto the apron, 5, from which it may be removed by any desired means either manually or mechanically.

The disc, 42, and the friction disc, 48, of the variable speed control mechanism, may be formed of any suitable materials, but I prefer to use a metal core, 49, surrounded by a compressed fiber ring to constitute the disc, 48, but bakelite, compressed wood or any other suitable material may be used for that purpose.

I claim:

1. A bread slicing machine comprising a frame having parallel side members suitably secured in spaced relation, a plurality of pairs of upper and lower cutter shafts mounted in the frame extending transversely thereof, a plurality of spaced cutter blades mounted upon each of said shafts, respectively, the cutters upon each shaft of any given pair being mounted to revolve in the same planes as the cutters upon the other shaft of said pair and the shafts of each pair being so spaced apart as to leave sufficient clearance for the crossbars hereinafter mentioned to pass between and clear the opposed cutters, a bread support secured between the side members at approximately the level of the lower series of shafts, longitudinal slots formed in the bread support in the paths of the cutter blades, front and rear conveyor shafts revolvably mounted in the frame having sprocket wheels mounted thereon, sprocket chains mounted upon the sprocket wheels and traveling midway between the shafts of each pair of cutter shafts, a plurality of spaced conveyor bars secured to and extending transversely of the sprocket chains at right angles thereto, the ends of each bar extending outwardly a short distance beyond the sprocket chains and into the grooves hereafter mentioned and being adapted to slide therein, a plurality of pins united to the rear edge of each of said respective conveyor bars and extending vertically above and below same and spaced thereon so as to travel between adjacent cutter blades, a longitudinal groove formed upon the inner face of each side frame intermediate the opposed cutter shafts and adapted to receive and guide the ends of the conveyor bars, a feed table secured in the frame, a feed roll mounted in the frame intermediate the feed table and the first of the cutter shafts with its periphery extending slightly above the feed table adapted to receive successive loaves of bread from the feed table and carry them forwardly into contact with the cutters upon the first pair of cutter shafts, and means for driving the cutter shafts at a high rate of speed and for driving the conveyor shafts at a much slower rate of speed and for driving the feed roll at an intermediate speed.

2. A bread slicing machine comprising a frame having parallel side members suitably secured in spaced relation, a plurality of pairs of upper and lower cutter shafts mounted in the frame extending transversely thereof, a plurality of spaced cutter blades mounted upon each of said shafts, respectively, the cutters upon each shaft of any given pair being mounted to revolve in the same planes as the cutters upon the other shaft of said pair and the shafts of each pair being so spaced apart as to leave sufficient clearance for the crossbars hereinafter mentioned to pass between and clear the opposed cutters, a bread support secured between the side members at approximately the level of the lower series of shafts, longitudinal slots formed in the bread support in the paths of the cutter blades, front and rear conveyor shafts revolvably mounted in the frame having sprocket wheels mounted thereon, sprocket chains mounted upon the sprocket wheels and traveling midway between the shafts of each pair of cutter shafts, a plurality of spaced conveyor bars secured to and extending transversely of the sprocket chains at right angles thereto, the ends of each bar extending outwardly a short distance beyond the sprocket chains and into the grooves hereafter mentioned and being adapted to slide therein, a plurality of pins united to the rear edge of each of said respective conveyor bars and extending vertically above and below same and spaced thereon so as to travel between adjacent cutter blades, a longitudinal groove formed upon the inner face of each side frame intermediate the opposed cutter shafts and adapted to receive and guide the ends of the conveyor bars, a feed table secured in the frame, a feed roll mounted in the frame intermediate the feed table and the first of the cutter shafts with its periphery extending slightly above the feed table adapted to receive successive loaves of bread from the feed table and carry them forwardly into contact with the cutters upon the first pair of cutter shafts, and means for driving the cutters, the conveyor bars, and the feed roll simultaneously at different speeds.

3. A bread slicing machine comprising a frame having parallel side members suitably secured in spaced relation, a plurality of pairs of upper and lower cutter shafts mounted in the frame extending transversely thereof, a plurality of spaced cutter blades mounted upon each of said shafts, respectively, the cutters upon each shaft of any given pair being mounted to revolve in the same planes as the cutters upon the other shaft of said pair and the shafts of each pair being so spaced apart as to leave sufficient clearance for the crossbars hereinafter mentioned to pass between and clear the opposed cutters, a bread support secured between the side members at approximately the level of the lower series of shafts, longitudinal slots formed in the bread support in the paths of the cutter blades, front and rear conveyor shafts revolvably mounted in the frame having sprocket wheels mounted thereon, sprocket chains mounted upon the sprocket wheels and traveling midway between the shafts of each pair of cutter shafts, a plurality of spaced conveyor bars secured to and extending transversely of the sprocket chains at right angles thereto, the ends of each bar extending outwardly a short distance beyond the sprocket chains and into the grooves hereafter mentioned and being adapted to slide therein, a plurality of pins united to the rear edge of each of said respective conveyor bars and extending vertically above and below same and spaced thereon so as to travel between adjacent cutter blades, a longitudinal groove formed upon the inner face of each side frame intermediate the opposed cutter shafts and adapted to receive and guide the ends of the conveyor bars, a feed table secured in the frame, a feed roll mounted in the frame intermediate the feed table and the first of the cutter shafts with its periphery extending slightly above the feed table adapted to receive successive loaves of bread from the feed table and carry them forwardly into contact with the cutters upon the first pair of cutter shafts, a discharge roll mounted in the frame at the rear of the bread support adapted to accelerate the movement of the sliced loaves, and means for driving the cutters, the conveyor bars, and the feed roll simultaneously at different speeds.

4. A bread slicing machine comprising a frame having parallel side members suitably secured in spaced relation, a plurality of pairs of upper and lower cutter shafts mounted in the frame extending transversely thereof, a plurality of spaced cutter blades mounted upon each of said shafts, respectively, the cutters upon each shaft of any given pair being mounted to revolve in the same planes as the cutters upon the other shaft of said pair and the shafts of each pair being so spaced apart as to leave sufficient clearance for the crossbars hereinafter mentioned to pass between and clear the opposed cutters, and the successive pairs of shafts being so spaced that the successive loaves of bread come into contact with the next succeeding set of cutter blades before entirely clearing a preceding set, a bread support secured between the side members at approximately the level of the lower series of shafts, longitudinal slots formed in the bread support in the paths of the cutter blades, front and rear conveyor shafts revolvably mounted in the frame having sprocket wheels mounted thereon, sprocket chains mounted upon the sprocket wheels and traveling midway between the shafts of each pair of cutter shafts, a plurality of spaced conveyor bars secured to and extending transversely of the sprocket chains at right angles thereto, the ends of each bar extending outwardly a short distance beyond the sprocket chains and into the grooves hereafter mentioned and being adapted to slide therein, a plurality of pins united to the rear edge of each of said respective conveyor bars and extending vertically above and below same and spaced thereon so as to travel between adjacent cutter blades, a longitudinal groove formed upon the inner face of each side frame intermediate the opposed cutter shafts and adapted to receive and guide the ends of the conveyor bars, a feed table secured in the frame, a feed roller mounted in the frame intermediate the feed table and the first of the cutter shafts with its periphery extending slightly above the feed table adapted to receive successive loaves of bread from the feed table and carry them forwardly into contact with the cutters upon the first pair of cutter shafts, and means for driving the cutter shafts at a high rate of speed and for driving the conveyor shafts at a much slower rate of speed and for driving the feed roller at an intermediate speed.

HARRY J. CRINER.